United States Patent [19]

Harvey

[11] Patent Number: 4,887,110
[45] Date of Patent: Dec. 12, 1989

[54] FILM CASSETTE

[75] Inventor: Donald M. Harvey, Webster, N.Y.

[73] Assignee: Eastman Kodak Company, Rochester, N.Y.

[21] Appl. No.: 296,473

[22] Filed: Jan. 12, 1989

[51] Int. Cl.⁴ ............................................. G03B 17/26
[52] U.S. Cl. ................................... 354/275; 242/71.1
[58] Field of Search ................. 354/216, 275; 242/71, 242/71.1, 71.2

[56] References Cited

U.S. PATENT DOCUMENTS

| 1,685,010 | 9/1928 | Thornton | 242/71.1 |
| 3,467,341 | 9/1969 | Roman | 242/197 |
| 3,684,206 | 8/1972 | Edwards | 242/71.2 |
| 3,747,865 | 7/1973 | Tobey | 242/71.1 X |
| 3,768,894 | 10/1973 | Cook | 354/275 X |
| 4,395,107 | 7/1983 | Lührig et al. | 354/275 |

Primary Examiner—L. T. Hix
Assistant Examiner—Brian W. Brown
Attorney, Agent, or Firm—Roger A. Fields

[57] ABSTRACT

A film cassette is adapted to propel a leading portion of a filmstrip from a light-tight cassette shell in response to rotation of a film spool in an unwinding direction. When the leading portion is advanced to exit the cassette shell, it falls off an exposure-not-completed indicator support to uncover the support. At the same time, the filmstrip continues to cover an exposure-completed indicator support. The exposure-completed indicator support is only uncovered when a trailing portion of the filmstrip falls off the support, after all of the available imaging areas of the filmstrip have been exposed. Conversely, should the filmstrip be rewound into the cassette shell midroll, i.e. before all of its imaging areas have been exposed, the exposure-completed indicator support remains covered. Thus, respective indications can be provided that the filmstrip is either partly or fully used.

9 Claims, 6 Drawing Sheets

FILM CASSETTE

CROSS-REFERENCE TO RELATED APPLICATIONS

Reference is made to commonly assigned copending applications Ser. No. 07/296,558, entitled FILM CASSETTE, and filed on the same day as this application in the name of Donald M. Harvey, and Ser. No. 07/296,466, entitled FILM CASSETTE, and filed on the same day as this application in the name of David E. Beach.

BACKGROUND OF THE INVENTION

1. Field of the Invention

The invention relates generally to the field of photography, and particularly to a film cassette containing roll film. More specifically, the invention relates to a film cassette having indicator means for informing the photographer that a film strip within the cassette is either partly exposed, completely exposed, or unexposed.

2. Description of the Prior Art

In conv;entional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is manually rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is reduced in width to allow it to protrude from between the circumferential lips and rest against the shell wall at a location inwardly of a film passageway to the outside of the cassette shell. During initial unwinding rotation of the film spool, the leading end of the filmstrip is required to "seek" the entrance to the film passageway. Then, it is advanced into and through the film passageway to exit the cassette shell. If the filmstrip is rewound midroll into the cassette shell, i.e. before all of its available imaging areas have been exposed, because the photographer wishes to change the film type, the film leader will be returned to its original location inwardly of the film passageway. Thus, in order to re-use the filmstrip to expose its remaining imaging areas, the leading end of the film leader will be required again to seek the entrance to the film passageway to exit the cassette shell.

In conventional 35 mm film manufacturers' cassettes, after the filmstrip is completely exposed, the film spool is rotated in a rewinding direction to wind the film leader into the cassette shell. Since the film leader cannot subsequently be advanced out of the cassette shell (because of the binding effect between the film roll and the shell), this usually serves as an indication that the filmstrip is completely exposed. Conversely, in the film cassette disclosed in U.S. Pat. No. 4,423,943, the film leader can be automatically advanced out of the cassette shell by rotating the film spool in the unwinding direction. This can be done regardless of whether the filmstrip is unexposed, completely exposed, or partly exposed. Thus, the film cassette provides no indication as to the exposure status of the filmstrip.

THE CROSS-REFERENCED APPLICATIONS

Like the type of film cassette disclosed in U.S. Pat. No. 4,423,923, cross-referenced applications Ser. Nos. 07/296,558 and 07/296,466 each disclose a film cassette that contains a filmstrip which is automatically advanced through a film passageway to the outside of the cassette shell in response to rotation of the film spool in an unwinding direction.

Cross-referenced application Ser. No. 07/296,558 discloses a film cassette wherein a film engaging member located along a film passage slit to the outside of the cassette shell is adapted to enter a trapping perforation in a leader portion of the filmstrip to secure the leader portion in the slit prior to initial advance of the filmstrip from the cassette shell or following midroll return of the filmstrip to the cassette shell. A trailing end portion of the filmstrip has a cut-out which enables the filmstrip to fall away from a support for normally positioning the filmstrip within range of the engaging member, when the filmstrip is advanced sufficiently from the cassette shell to move the cut-out to the support. The support includes exposure-completed indicia which is normally covered by the filmstrip, and therefore is not visible through a window in the cassette shell. When the filmstrip falls away from the support, the exposure-completed indicia is uncovered and can be viewed through the window. Thus, with this film cassette, the leader portion can advantageously be secured in the film passage slit prior to initial advance of the filmstrip from the cassette shell or following midroll return of the filmstrip to the shell, and therefore is not required to "seek" the slit as in U.S. Pat. No. 4,423,923. Conversely, when the filmstrip is completely exposed and returned to the cassette shell, the leader portion will not be secured in the film passage slit because the filmstrip will have fallen out of range of the film engaging member, thereby allowing the leader portion to be wound onto the film spool. Moreover, the exposure-completed indicia will be uncovered to inform the photographer that the filmstrip should not be re-used.

Similar to the film cassette disclosed in cross-referenced application Ser. No. 07/296,558, cross-referenced application Ser. No. 07/296,466 discloses a film cassette wherein exposure-completed indicia is located within a film passage slit to the outside of the cassette shell to be normally covered by the filmstrip. However, in this instance, the indicia is uncovered by the filmstrip only when a leader portion of the filmstrip is wound through the film passage slit further into the cassette shell, after the filmstrip is completely exposed. A window is provided in the cassette shell to view the indicia whenever it is uncovered.

SUMMARY OF THE INVENTION

According to the invention, there has been devised an improved film cassette wherein a filmstrip is advanced to the outside of a light-tight cassette shell in order to expose successive imaging areas of the filmstrip and can be returned to the inside of the cassette shell before all of the imaging areas have been exposed or after the filmstrip has been substantially completely exposed, and wherein the improvement comprises:

visual indicator means for providing respective visible indications that said filmstrip when returned to said cassette shell is substantially completely exposed or has at least one imaging area which remains to be exposed, whereby one is alerted that the filmstrip is either fully or partly used.

Preferably, the invention is embodied in a film cassette adapted to advance a leading portion of a filmstrip from a light-tight cassette shell in response to rotation of a film spool in an unwinding direction. When the leading portion is advanced to exit the cassette shell, it falls off an exposure-not-completed indicator support to uncover the support. At the same time, the filmstrip continues to cover an exposure-completed indicator support. The exposure-completed indicator support is only uncovered when a trailing portion of the filmstrip falls off the support, after all of the available imaging areas of the filmstrip have been exposed. Conversely, should the filmstrip be rewound into the cassette shell midroll, i.e. before all of its imaging areas have been exposed, the exposure-completed indicator support remains covered. Thus, respective indications can be provided that the filmstrip is either partly or fully used.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Referring now to the drawings, FIGS. 1–3 and 6 depict an improved 35 mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit. Alternatively, a light-trapping labyrinth may be provided within the film passage slit 25.

Figure 1:
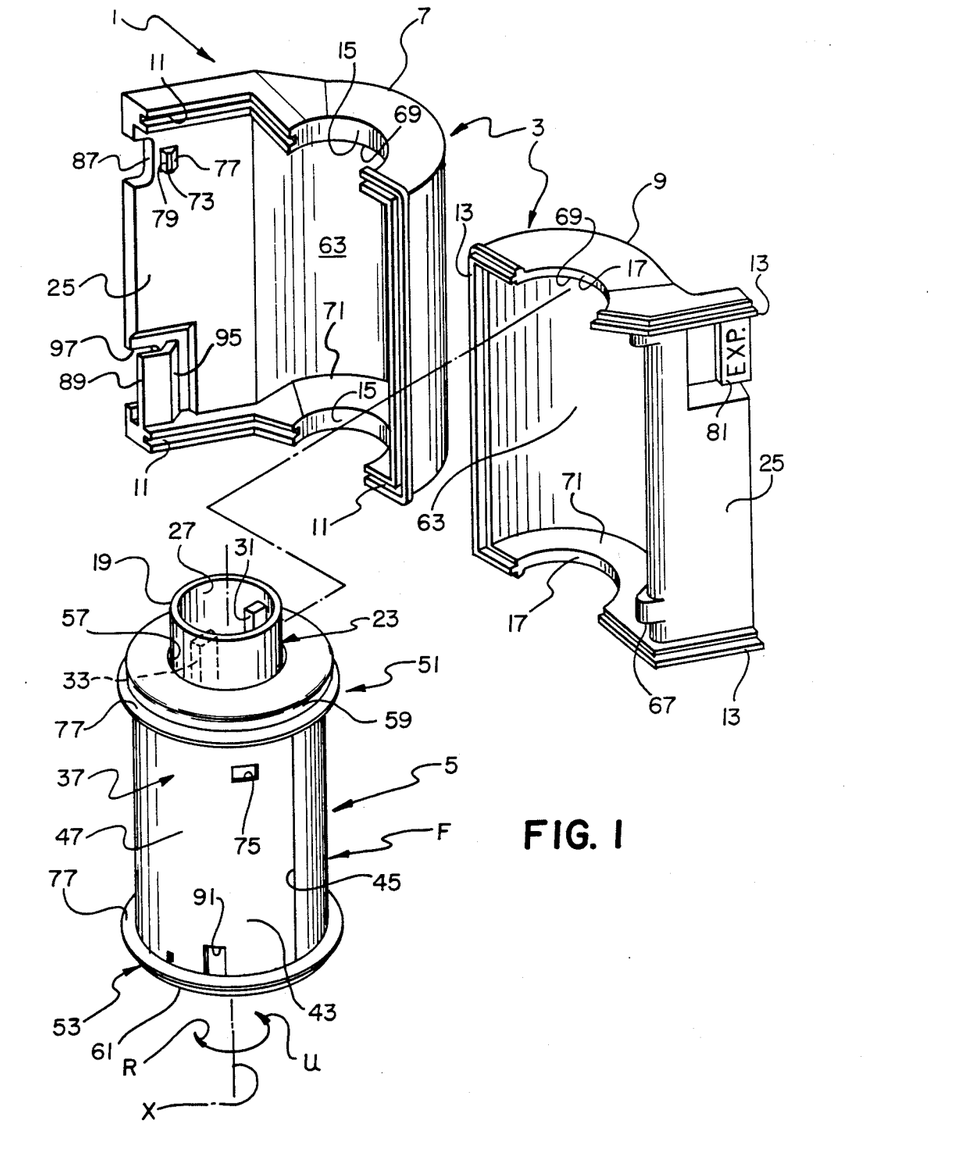
FIG. 1 is an exploded perspective view of an improved film cassette and a 35 mm filmstrip according to a preferred embodiment of the invention.
Figure 2:
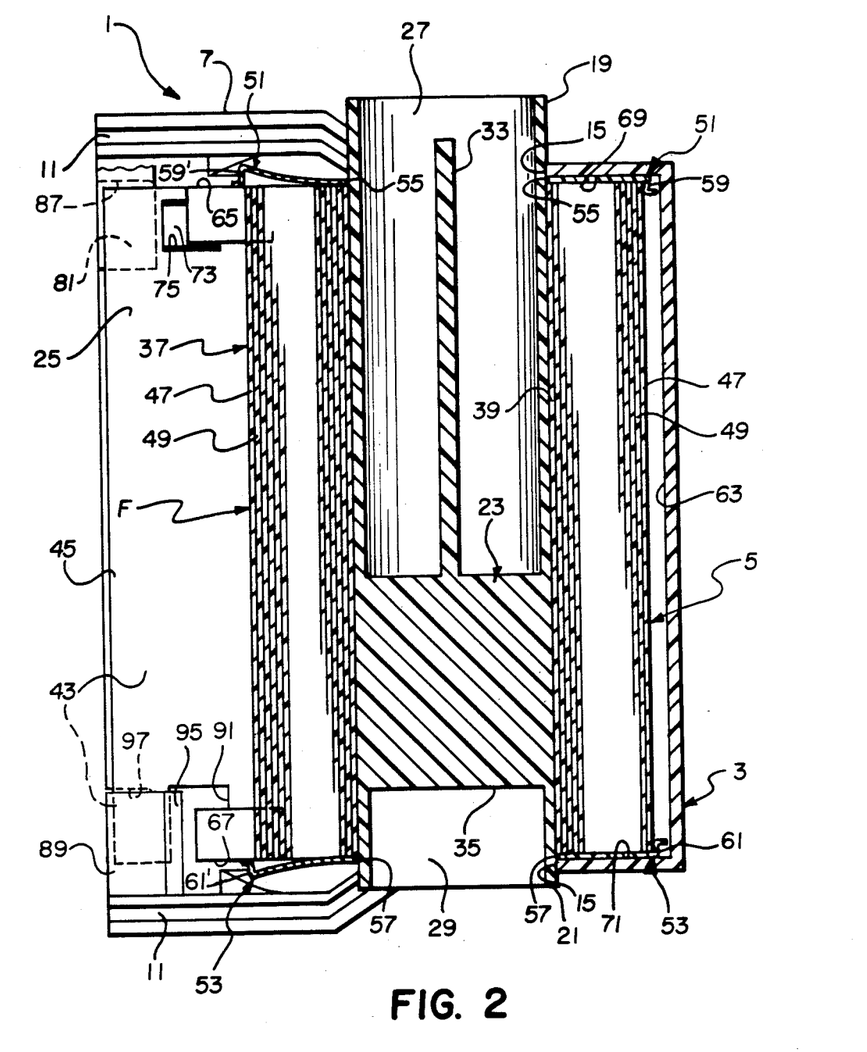
FIG. 2 is an elevation view in cross-section of the film cassette and the filmstrip.
Figure 3:
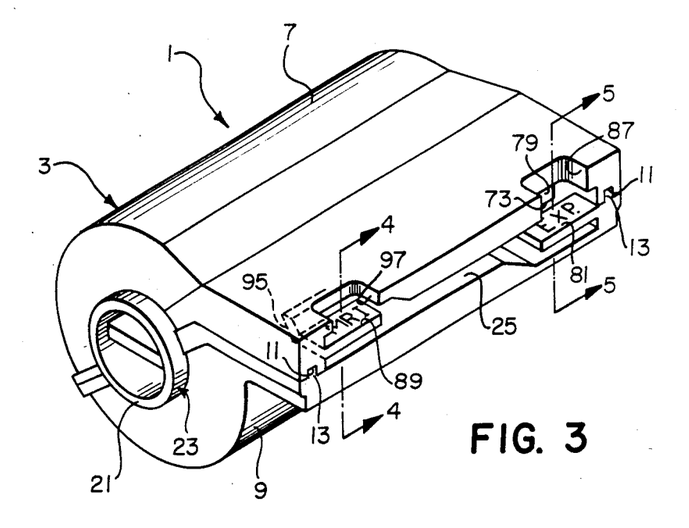
FIG. 3 is a front perspective view of the film cassette, shown without the filmstrip.
Figure 4:
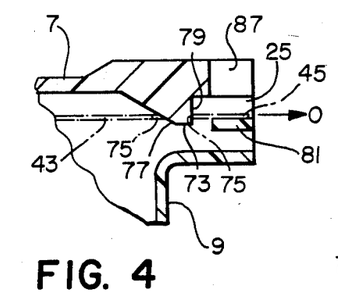
FIG. 4 is a sectional view of the film cassette as seen in the direction of the arrows 4,4 in FIG. 3, including the filmstrip shown in phantom.
Figure 5:
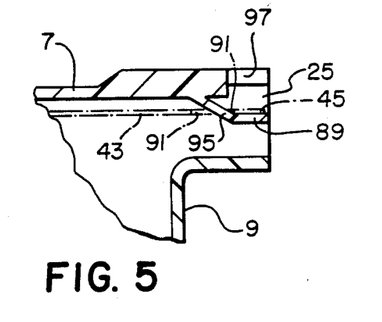
FIG. 5 is a sectional view of the film cassette as seen in the direction of the arrows 5,5 in FIG. 3, including the filmstrip shown in phantom.
Figure 6:
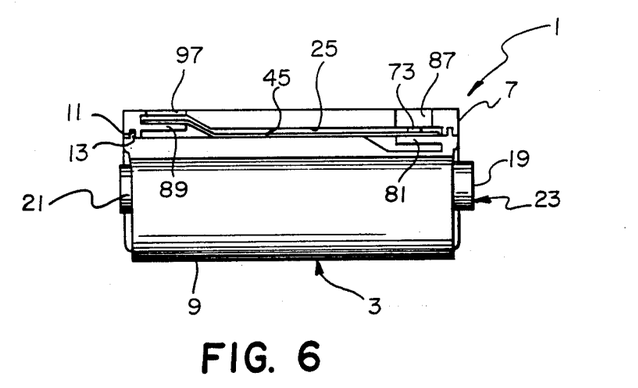
FIG. 6 is a front elevation view of the film cassette and the filmstrip.

The spool core 23 as shown in FIGS. 1–3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction U or to rotate the spool in a rewinding direction R opposite to the unwinding direction. See FIG. 1.

Figure 7:
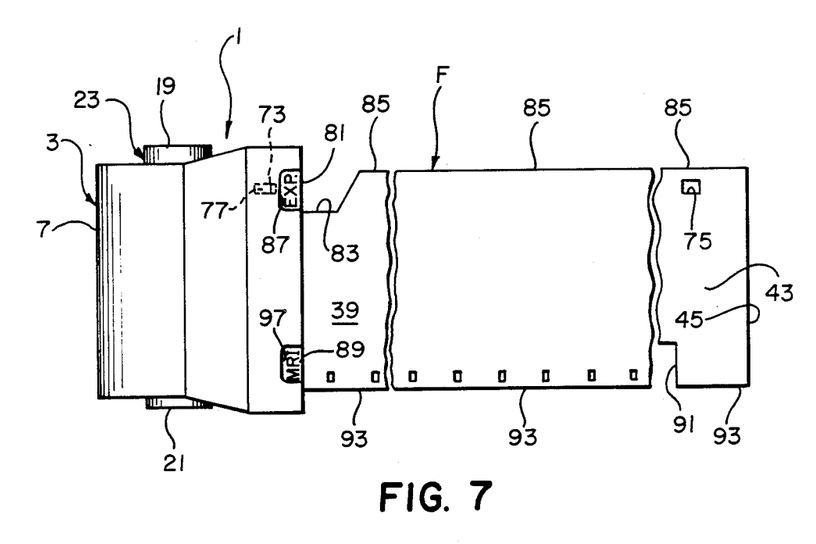
FIG. 7 is a top view of the film cassette, shown with the filmstrip advanced from the cassette shell.

A roll 37 of convoluted 35 mm film, i.e. a filmstrip F, is wound about the spool core 23. As indicated in FIGS. 1, 2, and 7, the film roll 37 has an inner or trailing end portion 39, immediately following the last-available image area or frame of the filmstrip F, which is attached to the spool core 23 by a suitable piece of adhesive tape or other suitable means, and a film leader or leader portion 43, immediately preceding the first-available imaging area or frame of the filmstrip. The film leader 43 has a leading or forward end 45 and comprises 2–3 convolutions of the film roll 37. One of these leader convolutions is the outermost convolution 47 and another of them is the next inward succeeding convolution 49.

A pair of flexible identical disks 51 and 53 are coaxially spaced along the spool core 23 to lightly rest against the opposite ends of the film roll 37. The two disks 51 and 53 cover the opposite ends of the film roll 37 and they have respective central holes 55 and 57 through which the spool core 23 longitudinally extends to permit rotation of the spool core relative to the disks. Although not shown, it is possible for the spool core 23 to include integral radially extending flanges disposed between the opposite ends of the film roll 37 and the respective disks 51 and 53. The two disks 51 and 53 have respective continuous circumferential lips 59 and 61 which extend at right angles to the peripheries of the disks to radially confine the outermost convolution 47 of the film roll 37, thereby to prevent the film roll from radially expanding or clock-springing into contact with an inner wall 63 of the cassette shell 3. As shown in FIG. 2, the film leader 43 initially protrudes from between opposite limited sections 59' and 61' of the respective lips 59 and 61 and into the film passage slit 25.

A pair of rigid identical spreader surfaces 65 and 67 are fixed to the cassette half 9 at separate locations inwardly of the film passage slit 25 as shown in FIGS. 1 and 2. The two spreader surfaces 65 and 67 deflect the opposite limited sections 59' and 61' of the two lips 59 and 61 axially away from each other to an axial dimension slightly exceeding the film width. See FIG. 2. In essence, the deflected sections 59' and 61' of the two lips 59 and 61 are axially spaced sufficiently to prevent those sections of the lips from radially confining corresponding sections of the outermost convolution 47 of the film roll 37. As indicated in FIGS. 1 and 2, the remaining portions of the two lips 59 and 61 are maintained in place by inner semi-circular flat surfaces 69 and 71 of the cassette shell 3 which abut the respective disks 51 and 53, except in the vicinity of the two spreader surfaces 65 and 67. Thus, the remaining portions of the two lips 59 and 61 continue to radially confine the outermost convolution 47.

In FIGS. 1–4, 8A and 8E, it can be seen that the cassette half 7 includes an integral film engaging member 73 disposed along the film passage slit 25 to enter a trapping perforation 75 in the film leader 43 in order to secure the film leader in the slit prior to initial advance of the filmstrip F from the cassette shell 3, before any of the imaging areas of the filmstrip are exposed, or following midroll return of the filmstrip F to the cassette shell, after only some of the imaging areas are exposed. The film engaging member 73 is ramped along its inward surface 77 relative to the direction 0 the filmstrip is to be advanced through the slit 25 to the outside of the cassette shell 3, to facilitate disengagement of the film leader 43 from the engaging member in response to movement of the filmstrip in that direction. See FIGS. 4, 8A and 8C. Also, the engaging member 73 is configured (vertically in FIGS. 4 and 8A) along its outward surface 79 relative to the direction (opposite to the direction 0) the filmstrip F is to be returned through the slit 25 to the inside of the cassette shell 3, to prevent disengagement of the film leader 43 from the engaging member should the filmstrip be urged to move in that direction rather than in the direction 0.

A flat film support 81, integrally formed with the cassette half 9, and shown in FIGS. 1–4 and 6–8A, is located within the film passage slit 25, proximate the film engaging member 73, for supporting the filmstrip F within range of the engaging member to permit the engaging member to engage the film leader 43. The trailing end portion 39 of the filmstrip F has a reduced width, effected by a cut-out 83 along the longitudinal film edge 85, that enables the filmstrip to fall away from the film support 81 to move out of range of the engaging member 73 when the filmstrip is advanced sufficiently from the cassette shell 3 to move the cut-out to the support. See FIGS. 7 and 8G.

Figure 9A:
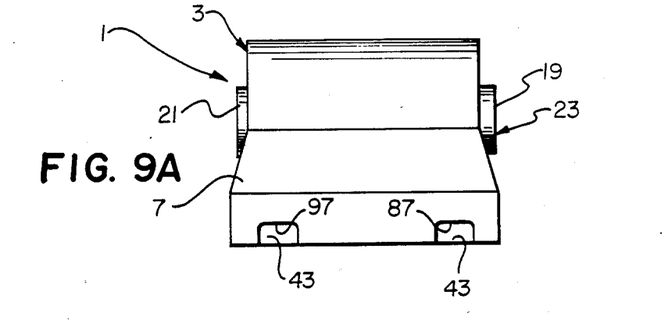
FIGS. 9A–9C are top plan views of the film cassette and the filmstrip in various stages of operation.
Figure 9B:
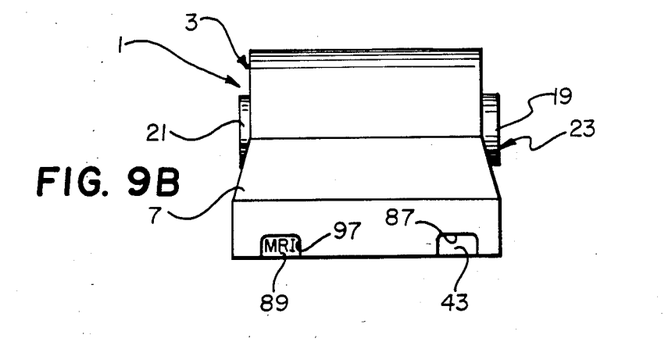
Figure 9C:
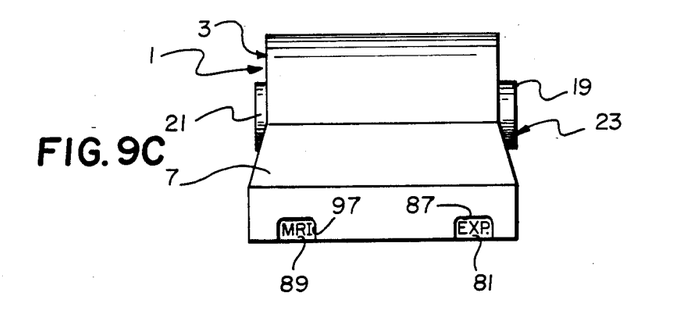

The film support 81 includes an exposure-completed indicia "EXP." that is normally covered by the filmstrip F and therefore is not visible through a window or opening 87 in the cassette half 7. When the filmstrip F falls away from the film support 81, the indicia "EXP." is uncovered and can be viewed through the window 87 as shown in FIG. 9C. The indicia "EXP." thus serves as a double exposure prevention warning by reminding the photographer not to reuse the filmstrip F.

Figure 8A:
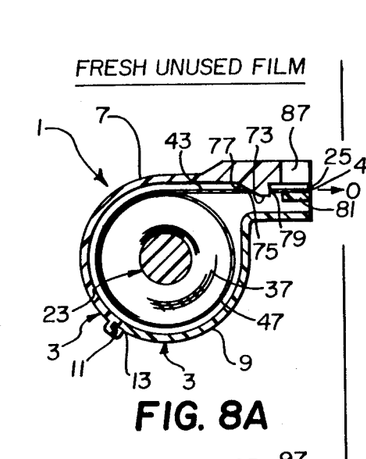
FIGS. 8A–8H are sectional views of the film cassette and the filmstrip in various stages of operation.
Figure 8B:
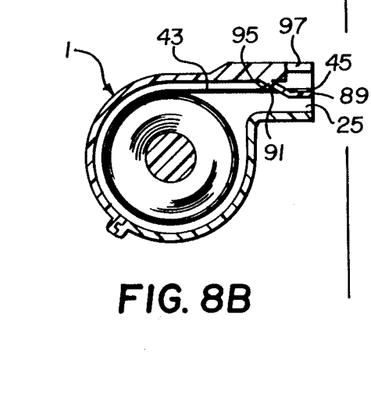
Figure 8C:
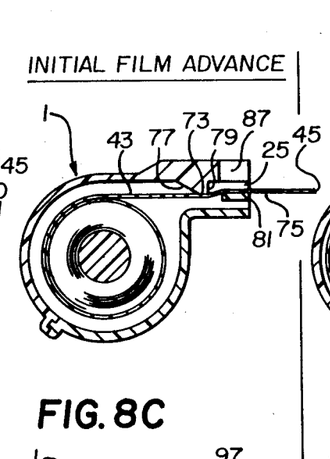
Figure 8D:
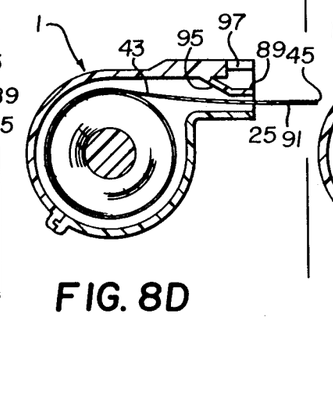

A flat film support 89, integrally formed with the cassette half 7, and shown in FIGS. 1–3, 5–7, and 8B, is located within the film passage slit 25, though along a different plane than the one occupied by the film support 81. See FIG. 6. The film leader 43 has a u-shaped cut-out 91 opening to the longitudinal film edge 93, which originally partly surrounds the film support 89. See FIGS. 5, 7, and 8B. When the filmstrip F is advanced initially from the cassette shell 3 as shown in FIG. 8D, the cut-out 91 moves past the film support 89, causing the film leader 43 to fall away from the film support. The film support 89 is inclined at its inward surface 95 to cam the film leader 43 off the film support.

Figure 8E:
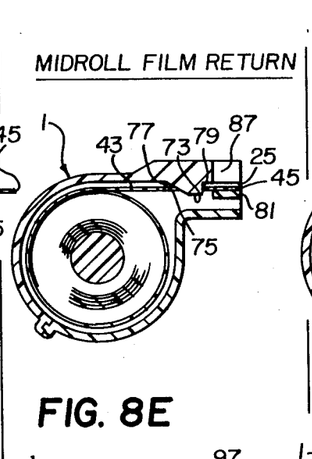
Figure 8F:
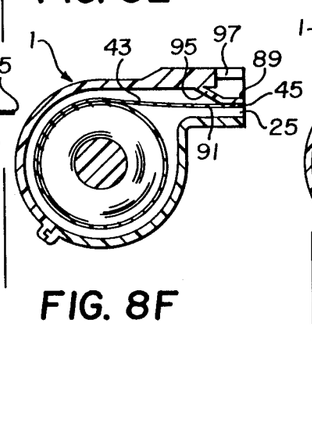

The film support 89 includes an exposure-not-completed indicia "MRI" (for midroll interrupt) that is normally covered by the film leader 43 and therefore is not visible through a window or opening 97 in the cassette half 7. See FIG. 9A. When the film leader 43 falls away from the film support 89, the indicia "MRI" is uncovered and can be viewed through the window 97 as shown in FIG. 9B. The indicia "MRI" can thus serve to remind the photographer that the filmstrip is partly exposed in the event the filmstrip is unwound into the cassette shell 3 before all of its imaging areas have been exposed. See FIGS. 8E, 8F, and 9B.

Operation

When the spool core 23 is initially rotated in the unwinding direction U, the two disks 51 and 53 may remain substantially stationary and the film roll 37, since its trailing end portion 39 is attached to the spool core, tends to expand radially to ensure a non-slipping relation between the outermost convolution 47 of the film roll and the circumferential lips 59 and 61 of the disks. See FIG. 2. Then, rotation of the spool core 23 in the same direction will similarly rotate the two disks 51 and 53. As a result, the two spreader surfaces 65 and 67 will deflect successive sections 59' and 61' of the circumferentially lips 59 and 61 axially away from each other as the respective sections are rotated past the spreader surfaces. The deflected sections 59' and 61' of the two lips 59 and 61 are returned to their original non-flexed condition by the semi-circular flat surfaces 69 and 71. As can be appreciated from FIG. 2, the outermost convolution 47 of the film roll 37 will be freed from the radial confinement of the two lips 59 and 61 in the vicinity of the two spreader surfaces 65 and 67, thereby allowing the film leader 43 to be advanced in the direction 0 in FIG. 8A out of engagement with the film engaging member 73 and to the outside of the cassette shell 3. Then, each successive rotation of the spool core 23 in the unwinding direction U will advance a corresponding section of the filmstrip F from the cassette shell 3.

Figure 8G:
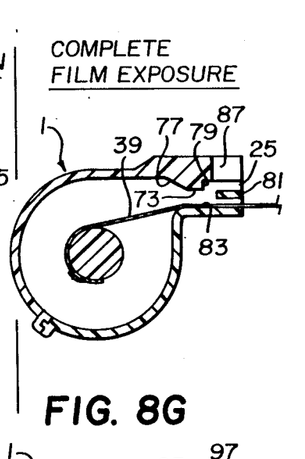
Figure 8H:
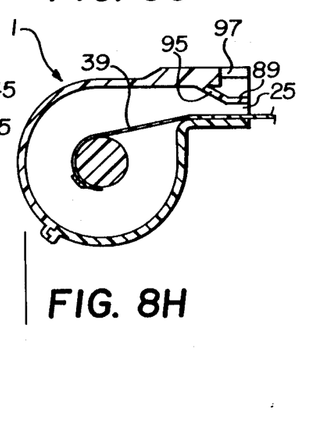

When the filmstrip F is advanced sufficiently from the cassette shell 3 to move the cut-out 83 of the trailing end portion 39 to the film support 81, the filmstrip will slip below the film support as shown in FIG. 8G, thereby permanently uncovering the exposure-completed indicia "EXP." During return of the filmstrip F to the cassette shell 3, the filmstrip F will be located below the film support 81. Thus, it will be maintained out of range of the film engaging member 73. This prevents the film leader 43 from being engaged by the engaging member 73 and allows the films leader (for the first time) to be wound onto the spool core 23. If the filmstrip F is returned midroll to the cassette shell 3 as in FIG. 8E, before all of the imaging areas have been exposed, it will not have had the opportunity to slip below the film support 81. Thus, the filmstrip F will continue to cover the exposure-completed indicia "EXP." and it will remain in range of the film engaging member 73, permitting the film leader 43 to be re-engaged by the engaging member as shown in FIG. 8E.

When the filmstrip F is advanced initially from the cassette shell 3 to disengage the film leader 43 from the film engaging member 73, the cut-out 91 of the film leader 43 moves past the film support 89, causing the film leader to slip below the film support as shown in FIG. 8D, thereby permanently uncovering the exposure-not-completed indicia "MRI". However, as shown in FIG. 8C the exposure-completed indicia "EXP" remains covered by the filmstrip F. Then, should the filmstrip be returned midroll to the cassette shell, only the exposure-not-completed indicia "MRI" will be visible. See FIGS. 8E, 8F and 9B.

The invention has been described with reference to a preferred embodiment. However, it will be appreciated that variations and modification can be effected within the ordinary skill in the art without departing from the scope of the invention.

I claim:

1. An improved film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, and wherein the improvement comprises:
   visual indicator means for providing respective visible indications that said filmstrip when returned to said cassette shell is substantially completely exposed or has at least one imaging area which remains to be exposed, whereby one is alerted that said filmstrip is either fully or partly used.

2. An improved film cassette wherein a filmstrip is advanced through a film passage slit to the outside of a light-tight cassette shell in order to expose successive imaging areas of the filmstrip and can be returned through said film passage slit to the inside of said cassette shell before all of said imaging areas have been exposed or after the filmstrip has been substantially completely exposed, and wherein the improvement comprises:
   exposure-not-completed indicator means located within said film passage slit for providing an indication that said filmstrip when returned to said cassette shell has at least one imaging area which remains to be exposed;
   exposure-completed indicator means located within said film passage slit for providing an indication that said filmstrip when returned to said cassette shell is substantially completely exposed; and
   window means formed in said cassette shell for viewing said exposure-not-completed indicator means and said exposure-completed indicator means.

3. An improved film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, and wherein the improvement comprises:
   exposure-not-completed indicator means for providing a visible indication that said filmstrip when returned to said cassette shell has at least one imaging area which remains to be exposed, said exposure-not-completed indicator means adapted to be normally covered by said filmstrip to prevent the indication it provides from being seen;
   exposure-completed indicator means for providing a visible indication that said filmstrip when returned to said cassette shell is substantially completely exposed, said exposure-completed indicator means adapted to be normally covered by said filmstrip to prevent the indication it provides from being seen;
   a leading portion of said filmstrip, preceding a first-available imaging area of the filmstrip, and said exposure-not-completed indicator means including respective cooperating means for causing said filmstrip to uncover the indicator means in response to advance of the filmstrip sufficiently to move the cooperating means of said leading portion past the cooperating means of said indicator means; and
   a trailing portion of said filmstrip, following a last-available imaging area of the filmstrip, and said exposure-completed indicator means including respective cooperating means for causing said filmstrip to uncover the indicator means in response to advance of the filmstrip sufficiently to move the cooperating means of said trailing portion past the cooperating means of said indicator means.

4. The improvement as recited in claim 3, wherein said exposure-not-completed indicator means and said exposure-completed indicator means include respective spaced film supports for said filmstrip, said cooperating means of the leading portion of said filmstrip is configured to enable the filmstrip to fall away from said film support of the exposure-not-completed indicator means to uncover the indicator means, and said cooperating means of the trailing portion of said filmstrip is configured to enable the filmstrip to fall away from said film support of the exposure-completed indicator means to uncover the indicator means.

5. An improved film cassette wherein a filmstrip is advanced to the outside of a light-tight cassette shell in order to expose successive imaging areas of said filmstrip and is returned to the inside of said cassette shell after the filmstrip has been substantially completely exposed, and wherein the improvement comprises:
   exposure-completed indicator means for providing a visible indication that said filmstrip when returned to said cassette shell is substantially completely exposed, said exposure-completed indicator means adapted to be normally covered by said filmstrip to prevent the indication it provides from being seen; and
   a trailing portion of said filmstrip, following a last-available imaging area of the filmstrip, and said exposure-completed indicator means including respective cooperating means for causing said filmstrip to uncover the indicator means in response to advance of the filmstrip sufficiently to move the cooperating means of said trailing portion past the cooperating means of said indicator means, whereby said indication provided by the indicator means can be seen following return of said filmstrip to said cassette shell after the filmstrip has been substantially completely exposed.

6. The improvement as recited in claim 5, wherein said exposure-completed indicator means includes a film support for said filmstrip, and said cooperating means of the trailing portion of said filmstrip is configured to enable the filmstrip to fall away from said film support to uncover said exposure-completed indicator means.

7. An improved film cassette wherein a filmstrip is advanced to the outside of a light-tight cassette shell in order to expose said filmstrip and is returned to the inside of said cassette shell after it is substantially completely exposed, and wherein the improvement comprises:
   a film support located within said cassette shell;
   exposure-completed indicia arranged on said film support means to be normally covered by said filmstrip;
   window means defining an opening in said cassette shell for permitting said exposure-completed indicia to be viewed when it is not covered by said filmstrip; and
   a trailing end portion of said filmstrip being configured to enable the filmstrip to fall away from said film support to permanently uncover said exposure-completed indicia when the filmstrip is advanced sufficiently from said cassette shell to position said trailing end portion at the film support, whereby said exposure-completed indicia can be viewed via said window means following return of said filmstrip to said cassette shell.

8. The improvement as recited in claim 7, wherein said film support is disposed to extend partially widthwise of said filmstrip to support the filmstrip, and said trailing end portion of the filmstrip has a reduced width which enables the filmstrip to fall away from said film support to uncover said exposure-completed indicia.

9. An improved film cassette wherein a filmstrip is advanced to the outside of a light-tight cassette shell in order to expose successive imaging areas of said filmstrip and can be returned to the inside of said cassette shell before all of said imaging areas have been exposed, and wherein the improvement comprises:
   exposure-not-completed indicator means for providing a visible indication that said filmstrip when returned to said cassette shell has at least one imaging area which remains to be exposed, said exposure-not-completed indicator means adapted to be normally covered by said filmstrip to prevent the indication it provides from being seen; and
   a leading portion of said filmstrip, preceding a first-available imaging area of the filmstrip, and said exposure-not-completed indicator means including respective cooperating means for causing said filmstrip to uncover the indicator means in response to advance of the filmstrip sufficiently to move the cooperating means of said leading portion past the cooperating means of said indicator means, whereby said indication provided by the indicator means can be seen following return of said filmstrip to said cassette shell before all of said imaging areas have been exposed.

* * * * *